US012748231B2

(12) United States Patent
Choi et al.

(10) Patent No.: US 12,748,231 B2
(45) Date of Patent: Sep. 29, 2026

(54) MACHINE LEARNING-BASED TWO-STEP IMPEDANCE INVERSION METHOD AND APPARATUS USING SEISMIC DATA

(71) Applicants: SK EARTHON CO., LTD., Seoul (KR); IUCF-HYU (Industry-University Cooperation Foundation Hanyang University), Seoul (KR)

(72) Inventors: Jun Hwan Choi, Seoul (KR); Chang Ho Jeong, Seoul (KR); Hyung Wook Choi, Seoul (KR); Joong Moo Byun, Seoul (KR); Jeong Hun Yoo, Seoul (KR); Do Wan Kim, Seoul (KR)

(73) Assignees: SK EARTHON CO., LTD., Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 395 days.

(21) Appl. No.: 18/532,203

(22) Filed: Dec. 7, 2023

(65) Prior Publication Data

US 2024/0192394 A1 Jun. 13, 2024

(30) Foreign Application Priority Data

Dec. 7, 2022 (KR) ........................ 10-2022-0169748

(51) Int. Cl.
*G01V 1/36* (2006.01)
*G01V 1/28* (2006.01)

(52) U.S. Cl.
CPC .............. *G01V 1/368* (2013.01); *G01V 1/282* (2013.01)

(58) Field of Classification Search
CPC .......... G01V 1/368; G01V 1/364; G01V 1/36; G01V 1/28; G01V 1/00; G01V 1/282;
(Continued)

(56) References Cited

U.S. PATENT DOCUMENTS 10,802,171 B2 10/2020 Meek
11,409,013 B2 * 8/2022 Wang ........................ G06N 3/04
(Continued)

FOREIGN PATENT DOCUMENTS

CN 113820741 A 12/2021

OTHER PUBLICATIONS

Yoo et al. ,"Domain adaptation-based acoustic impedance estimation with seismic data constraint", Nov. 15, 2021, Geoscience, Paper No. SEG-2021-3594199 (Year: 2021).*
(Continued)

*Primary Examiner* — Mohamed Charioui
(74) *Attorney, Agent, or Firm* — IP&T GROUP LLP

(57) ABSTRACT

Techniques for a machine learning-based two-step impedance inversion method using seismic data are disclosed. In some embodiments of the disclosed technology, an impedance inversion method includes generating a domain adaptation model configured to predict, based on source data associated with a source area that includes a well, a P-impedance value of a target area that does not include a well, and generating, using the P-impedance value generated by the domain adaptation model, a P-impedance low frequency model configured to predict a final P-impedance value of the target area by performing an inversion. In this way, it is possible to accurately predict P-impedance value of an area where a well does not exist.

13 Claims, 9 Drawing Sheets

(58) Field of Classification Search
CPC .... G01V 1/306; G01V 1/30; G01V 2210/324; G01V 2210/32; G01V 2210/30; G01V 2210/00; G06N 20/00
See application file for complete search history.

(56) References Cited

U.S. PATENT DOCUMENTS

| | | | | |
|---|---|---|---|---|
| 2019/0293818 | A1* | 9/2019 | Meek | G01V 1/306 |
| 2021/0165119 | A1* | 6/2021 | Xia | G01V 1/50 |
| 2023/0026857 | A1* | 1/2023 | Di | G01V 1/345 |

OTHER PUBLICATIONS

Ganin et al., "Domain-Adversarial Training of Neural Networks", 2016, Journal of Machine Learning Research 17, pp. 1-35 (Year: 2016).*

Castagna et al., "Relationships between compressional-wave and shear-wave velocities in clastic silicate rocks", Apr. 1985, Geophysics, vol. 50, pp. 571-581. (Year: 1985).*

Gardner et al., "formation Velocity and Density—The diagnostic Basics for Stratigraphic Traps", Dec. 1974, Geophysics, vol. 39, No. 6, pp. 770-780. (Year: 1974).*

Yoo, J. et al., "Domain adaptation-based acoustic impedance estimation with seismic data constraint," Society of Exploration Geophysicists, First International Meeting for Applied Geoscience & Energy, 2021.

Yoo, J. et al., "Impedance Inversion Based on Domain Adaptation Technique With Reconstruction," IEEE Geoscience and Remote Sensing Letters, vol. 19, 2022.

Ahmad Mustafa et al., Joint Learning for Seismic Inversion: An Acoustic Impedance Estimation Case Study, SEG Annual Meeting, Oct. 14, 2020, Houston, TX.

Yuqing Wang et al., Physics-Constrained Seismic Impedance Inversion Based on Deep Learning, IEEE Geoscience and Remote Sensing Letters, Apr. 22, 2021, pp. 1-5, vol. 19, IEEE.

Amit Kumar Ray et al., Building more robust low-frequency models for seismic impedance inversion, First Break, May 1, 2016, pp. 47-52, vol. 34 issue 5, European Association of Geoscientists & Engineers.

Office Action for Korean Patent Application No. 10-2022-0169748 issued by the Korean Patent Office on Mar. 19, 2026.

* cited by examiner

MACHINE LEARNING-BASED TWO-STEP IMPEDANCE INVERSION METHOD AND APPARATUS USING SEISMIC DATA

CROSS REFERENCE TO RELATED APPLICATION

This patent document claims the priority and benefits of Korean Patent Application No. 10-2022-0169748, filed Dec. 7, 2022, the entire contents of which are incorporated herein by reference for all purposes.

TECHNICAL FIELD

The disclosed technology relates to a machine learning-based two-step impedance inversion method and apparatus using seismic data.

BACKGROUND

Seismic data is used to find a formation that contains oil or gas by creating an image of the Earth's subsurface. Impedance inversion is a method that can be used to understand the formation by analyzing the seismic data. An initial low frequency model is generated using seismic data and well log data, and impedance inversion is performed using the initial low frequency model. P-impedance value may be obtained by performing the impedance inversion, and the formation may be analyzed using the P-impedance value.

SUMMARY

The disclosed technology provides a machine learning-based two-step impedance inversion method and apparatus including a first step of generating P-impedance value of an area without a well using machine learning and a second step of generating a low frequency model and predicting final P-impedance value through inversion.

In an aspect of the disclosed technology, a machine learning-based two-step impedance inversion method using seismic data may include: generating a domain adaptation model based on a source data associated with a source area that includes a well and a target area that does not include a well, and predicting a P-impedance value of the target area; and generating, using the P-impedance value generated by the domain adaptation model, a P-impedance low frequency model configured to predict a final P-impedance value of the target area by performing an inversion.

In an embodiment, the generating the domain adaptation model may include: extracting: feature information from seismic data of source data associated with the source area; and feature information from seismic data of target data associated with the target area; generating a first loss function value that decreases upon a decrease in an accuracy of determination in response to determining whether the feature information is associated with the source area or the target area; generating a second loss function value representing a difference between a label of the feature information extracted from the source data and a label of the source data associated with well log data by predicting the label of the feature information extracted from the source data using a label prediction algorithm; retraining a feature extraction algorithm to decrease a sum of the first loss function value and the second loss function value until the sum of the first loss function value and the second loss function value reaches a predetermined minimum value; and predicting a label corresponding to the seismic data of the target data using a label prediction algorithm.

In an embodiment, the generating the P-impedance low frequency model may include: performing a preprocessing operation by generating the P-impedance low frequency model using the P-impedance value; and performing an inversion operation by predicting the final P-impedance value using the P-impedance low frequency model and the seismic data of the target data.

In an embodiment, the preprocessing operation may include: performing a smoothing operation by obtaining a smoothed P-impedance value by smoothing the P-impedance value; and performing a filtering operation by obtaining the P-impedance low frequency model by applying a filter to the smoothed P-impedance value.

In an embodiment, the preprocessing operation may further include: performing an extension operation by obtaining a smoothed S-impedance value using the smoothed P-impedance value; the filtering operation may further include obtaining an S-impedance low frequency model by applying a filter to the smoothed S-impedance value; and the inversion operation may include predicting the final P-impedance value of the target area and a final S-impedance value of target area by performing simultaneous inversion on P-impedance value and an S-impedance value using the P-impedance low frequency model, the S-impedance low frequency model and the seismic data of the target data.

In an embodiment, the extension operation may further include obtaining a smoothed density value using the smoothed P-impedance value; the filtering operation may further include obtaining a density low frequency model by applying a filter to the smoothed density value; and the inversion operation may include predicting the final P-impedance value of the target area, the final S-impedance value of the target area, and a final density value of the target area by performing a simultaneous inversion on the P-impedance value, the S-impedance value and density value using the P-impedance low frequency model, the S-impedance low frequency model, the density low frequency model and the seismic data of the target data.

In an embodiment, the extension operation may include converting the smoothed P-impedance value into the smoothed S-impedance value using a relational expression derived from a relationship between a P-impedance value and an S-impedance value included in the well log data of the source data.

In an embodiment, the extension operation may include converting the smoothed P-impedance value into the smoothed density value using a relational expression derived from a relationship between a P-impedance value and a density value included in the well log data of the source data.

In an aspect of the disclosed technology, a machine learning-based two-step impedance inversion apparatus using seismic data may include: a processor; and a storage unit communicatively connected to the processor, and configured to store program codes operating in the processor, the program codes including: a training module configured to generate a domain adaptation model for predicting a P-impedance value of a target area that does not include a well by using source data obtained from a source area that includes a well and target data obtained from the target area; a preprocessing module configured to generate a P-impedance low frequency model by using the P-impedance value generated by the domain adaptation model; and an inversion module configured to generate a final P-impedance value by performing inversion using the P-impedance low frequency model and the target data.

In an embodiment, the training module may be configured to: extract feature information from seismic data of the source data and feature information from seismic data of the target data, using a feature extraction algorithm, determine, using a domain classification algorithm, whether the feature information is associated with the source area or the target area, generate a first loss function value that decreases upon a decrease in an accuracy of determination using the domain classification algorithm, predict, using a label prediction algorithm, a label of the feature information extracted from the seismic data of the source data, generate a second loss function value that decrease upon an increase in the accuracy of prediction, retrain the feature extraction algorithm to decrease a sum of the first loss function value and the second loss function value, stop training of the domain adaptation model upon a determination that the sum of the first loss function value and the second loss function value reaches a predetermined minimum value, and predict a label corresponding to the seismic data of the target data using the label prediction algorithm.

In an embodiment, the preprocessing module may be configured to: obtain a smoothed P-impedance value by smoothing the P-impedance value, and obtain a P-impedance low frequency model by applying a filter to the smoothed P-impedance value.

In an embodiment, the preprocessing module may further be configured to: obtain a smoothed S-impedance value using the smoothed P-impedance value, and obtain an S-impedance low frequency model by applying a filter to the smoothed S-impedance value; and the inversion module may be configured to predict the final P-impedance value and a final S-impedance value by performing simultaneous inversion on the P-impedance value and an S-impedance value using the P-impedance low frequency model, the S-impedance low frequency model and the seismic data of the target data.

In an embodiment, the preprocessing module may further be configured to: obtain a smoothed density value using the smoothed P-impedance value, and obtain a density low frequency model by applying a filter to the smoothed density value; and the inversion module may be configured to predict the final P-impedance value, the final S-impedance value and a final density value by performing a simultaneous inversion on the P-impedance value, the S-impedance value and a density value using the P-impedance low frequency model, the S-impedance low frequency model, the density low frequency model and the seismic data of the target data.

In an embodiment, the preprocessing module may be configured to convert the smoothed P-impedance value into the smoothed S-impedance value using a relational expression derived from a relationship between a P-impedance value and an S-impedance value included in well log data of the source data.

In an embodiment, the preprocessing module may be configured to convert the smoothed P-impedance value into the smoothed density value using a relational expression derived from a relationship between a P-impedance value and a density value included in well log data of the source data.

Features and advantages of the disclosed technology will be more apparent from the following detailed description taken in conjunction with the accompanying drawings.

Prior to the following detailed description, the terms or words used in the specification and the claims of the disclosed technology should not be construed as being typical or dictionary meanings, but should be construed as meanings and concepts conforming to the technical spirit of the disclosed technology on the basis of the principle that an inventor can properly define the concepts of the terms in order to describe his or her invention in the best way.

In some embodiments of the disclosed technology, by performing a first step of generating P-impedance value of an area without a well using machine learning and a second step of generating a low frequency model and predicting final P-impedance value through inversion, it is possible to predict impedance with high accuracy.

DETAILED DESCRIPTION

Seismic exploration for oil and gas, or others can be guided by seismic data based on directing seismic energy into a location of interest and detecting reflected seismic waves by different layers underneath the surface of the location of interest. Such seismic data can be further processed to extract useful information for identifying presence of gas or oil reservoirs. Different layers at the location of interest may different P impedances and seismic waves are reflected at the boundary of different layers. Accordingly, the acoustic impedance is one of important parameters in seismic survey and can be extracted from seismic data based on various impedance inversion methods.

Hereinafter, some embodiments of the disclosed technology will be described in detail with reference to the accompanying drawings to disclose effective impedance inversion methods and computer-based devices or systems for performing the impedance invention.

In some embodiments, the term "impedance inversion apparatus" can be used to indicate a machine learning-based two-step impedance inversion apparatus 10 using seismic data. In some embodiments, the term "impedance inversion method" can be used to indicate a machine learning-based two-step impedance inversion method using seismic data. In some implementations, the term "impedance inversion" can be used to indicate a method for transforming seismic data into acoustic impedance data, which allows for an integrated approach to geological interpretation.

Figure 1:
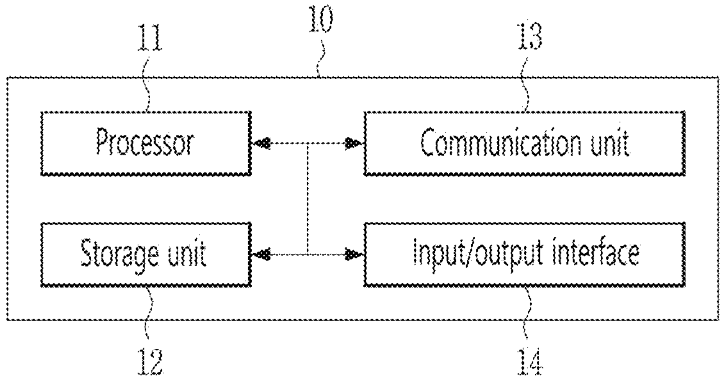
FIG. 1 shows an example of a machine learning-based two-step impedance inversion apparatus using seismic data based on an embodiment.

FIG. 1 shows an example of a machine learning-based two-step impedance inversion apparatus 10 using seismic data based on an embodiment.

The impedance inversion apparatus 10 may include a processor 11, and a storage unit 12 communicatively connected to the processor 11 to store program codes operating in the processor 11. The storage unit 12 may store program codes written to perform a machine learning-based two-step impedance inversion method using seismic data, a domain adaptation model, seismic data, well log data, and other necessary data.

The processor 11 may be an information processing unit capable of reading program codes from the storage unit 12 and executing the read program codes. For example, the processor 11 may include a CPU, a GPU, or other information processing chips. The impedance inversion apparatus 10 may include at least one processor 11.

The storage unit 12 may include a memory, a hard disk, a cloud storage, a DVD and/or various other storage media configured to store data. The storage unit 12 may store program codes to perform respective operations or steps of the impedance inversion method based on an embodiment. The storage unit 12 may store algorithms for performing the impedance inversion method, source data, target data, a domain adaptation model, etc.

In an embodiment, the impedance inversion apparatus 10 may further include a communication unit 13 communicatively connected to the processor 11. The communication unit 13 may transmit and receive data by being communicatively connected to a wired or wireless network. The communication unit 13 may use various communication methods such as a wired communication method such as Ethernet, LAN and WAN, a mobile communication method such as 5G and 6G and a short-distance communication method such as Wi-Fi, Bluetooth and Zigbee. In an embodiment, the impedance inversion apparatus 10 may further include an input/output interface 14 which is communicatively connected to the processor 11 and is capable of receiving a command or data from a user or visually displaying a prediction result to the user. The input/output interface 14 may include an input device such as a keyboard, a mouse, a touch panel and a keypad and an output device such as a display, a monitor, a printer and a speaker.

The impedance inversion apparatus 10 may be an information processing apparatus including the processor 11 and the storage unit 12. For example, the impedance inversion apparatus 10 may be a PC, a server, a smart phone, a tablet PC, or various other information processing apparatuses.

Figure 2:
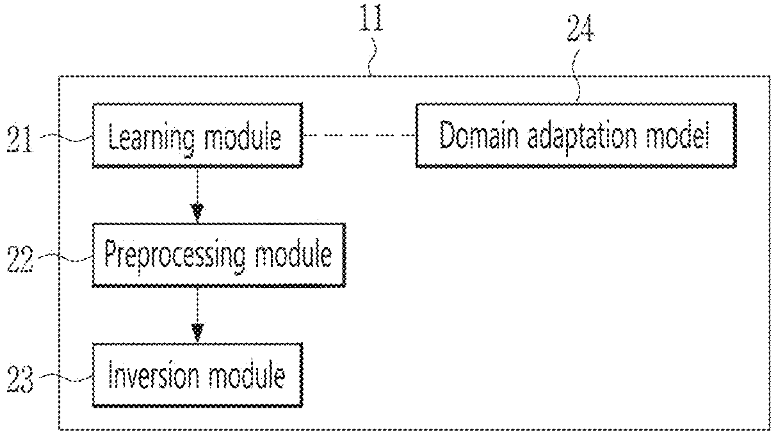
FIG. 2 shows example modules of the machine learning-based two-step impedance inversion apparatus using seismic data based on an embodiment.

FIG. 2 shows example modules of the machine learning-based two-step impedance inversion apparatus 10 using seismic data based on an embodiment.

In an embodiment, the processor 11 may include a training module 21, a preprocessing module 22 and an inversion module 23. These modules implemented based on an embodiment may include program codes/software that can be executed in the processor 11 and/or hardware that operates in the processor 11.

The program codes based on an embodiment may include a training module 21, a preprocessing module 22, and an inversion module 23. In some implementations, the training module 21 may generate a domain adaptation model for predicting a P-impedance value of a target area that does not include a well (e.g., oil well) by using (1) source data obtained from an source area that includes a well and (2) target data obtained from an target area that does not include a well. In some implementations, the term "source area" can be used to indicate the area that includes a well, and the term "target area" can be used to indicate the area that does not include a well.

In seismic survey for exploration of oil and gas, depending on incidence angle, the seismic waves can include the information of (1) P-waves for compressional waves causing vibrations along the direction of the wave propagation and (2) S-waves for shear waves causing vibrations perpendicular to the direction of wave propagation. P-waves and S-waves tend to travel at different velocities. In rocks, P-waves tend to travel faster than S-waves and the P-impedance value for the P-wave tends to be smaller than S-impedance value for the S-waves.

In some implementations, the term "P-impedance value" may be used to indicate a P-wave impedance. In one example, P-impedance value can be the product of density value and P-wave velocity. In some implementations, the preprocessing module 22 may generate a P-impedance low frequency model by using the P-impedance value generated by the domain adaptation model. In some implementations, the inversion module 23 may generate a final P-impedance value by performing an inversion using the P-impedance low frequency model and the target data.

In some embodiments of the disclosed technology, an area where well log data is obtained (e.g., an area where a well is drilled) is referred to as a source area, and an area where there is no well log data and only seismic data is present (e.g., an area where a well does not exist) is referred to as a target area. The source data includes well log data and seismic data obtained from the source area. The well log data of the source data may be matched to the label of the seismic data. The target data includes the seismic data obtained from the target area. Since a well is not drilled in the target area, well log data is not present in the target data. A label is not present in the seismic data of the target data.

In some implementations, the domain adaptation model may be stored in the storage unit 12 as program codes and may be executed in the processor 11. The domain adaptation model may adapt the information of a target domain on the basis of the information of a source domain. The source domain is the source data, and the target domain is the target data.

The domain adaptation model associated with a domain adaptation method may be trained to generate or output a label of the unlabeled target data based on the labeled source data. The label of the source data of the trained domain adaptation model is P-impedance value log among the well log data. This is because the P-impedance value log is a value that may be measured most easily and accurately while obtaining the well log data. When the training is completed, the domain adaptation model may predict a label for the seismic data of the target data. The label for the seismic data of the target data is P-impedance value.

The training module 21 may generate the domain adaptation model that predicts the P-impedance value of the target area using the source data and the target data. The domain adaptation model may be configured to simultaneously perform (1) a training operation of the P-impedance value of the well log data to obtain a label corresponding to the seismic data of the source data and (2) a learning operation in a manner such that the seismic data of the source data and the seismic data of the target data cannot be classified. The domain adaptation model for which a domain adaptation has been completed may predict P-impedance value as a label corresponding to the seismic data of the target data. The training module 21 may perform the following operations. The training module 21 may extract feature information from the seismic data of the source data and extract feature information from the seismic data of the target data, using a feature extraction algorithm. The training module 21 may determine, using a domain classification algorithm, whether the feature information is associated with the source area or a target area. The training module 21 may generate a first loss function value that decreases in an accuracy of determination using the domain classification algorithm. The training module 21 may predict, using a label prediction algorithm, the label of the feature information extracted from the seismic data of the source data. The training module 21 may generate a second loss function value that decreases upon an increase in the accuracy of prediction. The training module 21 may retrain the feature extraction algorithm to decrease a sum of the first loss function value and the second loss function value. The training module 21 may stop training the domain adaptation model upon a determination that the sum of the first loss function value and the second loss function value reaches a predetermined minimum value. The training module 21 may predict a label corresponding to the seismic data of the target data using the label prediction algorithm. The label corresponding to the seismic data of the target data is the P-impedance value of the target area.

The preprocessing module 22 may obtain a smoothed P-impedance value by smoothing the P-impedance value, and may obtain the P-impedance low frequency model by applying a filter to the smoothed P-impedance value.

The inversion module 23 may obtain the final P-impedance value by performing an inversion using the P-impedance low frequency model obtained from the preprocessing module 22 and the seismic data of the area without a well (e.g., target area).

In an embodiment, the P-impedance low frequency model can be obtained by preprocessing the P-impedance value of the target area generated by the trained domain adaptation model and the inversion is performed to obtain the final P-impedance value by using the P-impedance low frequency model and the seismic data of the target data. In this way, it is possible to improve prediction accuracy of P-impedance value.

The impedance inversion apparatus 10 based on an embodiment of the disclosed technology may also predict S-impedance value and density value. In some implementations, the term "S-impedance value" may be used to indicate an S-wave impedance. The preprocessing module 22 may further obtain a smoothed S-impedance value using the smoothed P-impedance value, and may further obtain an S-impedance low frequency model by applying a filter to the smoothed S-impedance value. The preprocessing module 22 may convert the smoothed P-impedance value into the smoothed S-impedance value using a relational expression derived on the basis of the relationship between a P-impedance value and a S-impedance value included in the well log data of the source data. The inversion module 23 may predict the final P-impedance value and the final S-impedance value by performing a simultaneous inversion on the P-impedance value and the S-impedance value using the P-impedance low frequency model, the S-impedance low frequency model and the seismic data of the target data.

The preprocessing module 22 may further obtain a smoothed density value using the smoothed P-impedance value, and may further obtain a density low frequency model by applying a filter to the smoothed density value. The preprocessing module 22 may convert the smoothed P-impedance value into the smoothed density value using a relational expression derived from the relationship between a P-impedance value and density value included in the well log data of the source data. The inversion module 23 may predict final P-impedance value, final S-impedance value and a final density value by performing a simultaneous inversion on the P-impedance value, the S-impedance value and the density value using the P-impedance low frequency model, the S-impedance low frequency model, the density low frequency model and the seismic data of the target data.

The impedance inversion apparatus 10 based on an embodiment may predict not only the final P-impedance value but also the final S-impedance value and the final density value. Since the final S-impedance value and the final density value are also predicted by performing a second step S20, the formation of the target area may be analyzed more accurately. Since the simultaneous inversion on the P-impedance value, the S-impedance value and the density value is performed, more accurate prediction is possible than a case where inversion is performed on each of the P-impedance value, the S-impedance value and the density value.

Figure 3:
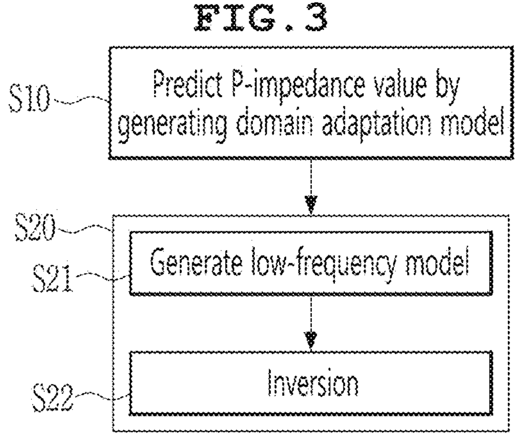
FIG. 3 shows example operations of a machine learning-based two-step impedance inversion method using seismic data based on an embodiment.

FIG. 3 shows example operations of a machine learning-based two-step impedance inversion method using seismic data based on an embodiment.

The impedance inversion method may include a first step S10 of generating a domain adaptation model and predicting P-impedance value of an area where a well does not exist, and the second step S20 of generating a P-impedance low frequency model using the P-impedance value and predicting final P-impedance value by performing inversion. The second step S20 may include a preprocessing step S21 of generating the P-impedance low frequency model using the P-impedance value, and an inversion step S22 of predicting the final P-impedance value by performing inversion using the P-impedance low frequency model and seismic data of target data.

The impedance inversion method may be performed in such a method that the processor 11 reads program codes stored in the storage unit 12 and executes the read program codes. In the impedance inversion method, by obtaining the final P-impedance value by additionally performing the second step S20 on the P-impedance value obtained by performing the first step S10, it is possible to improve prediction accuracy of P-impedance value.

Figure 4:
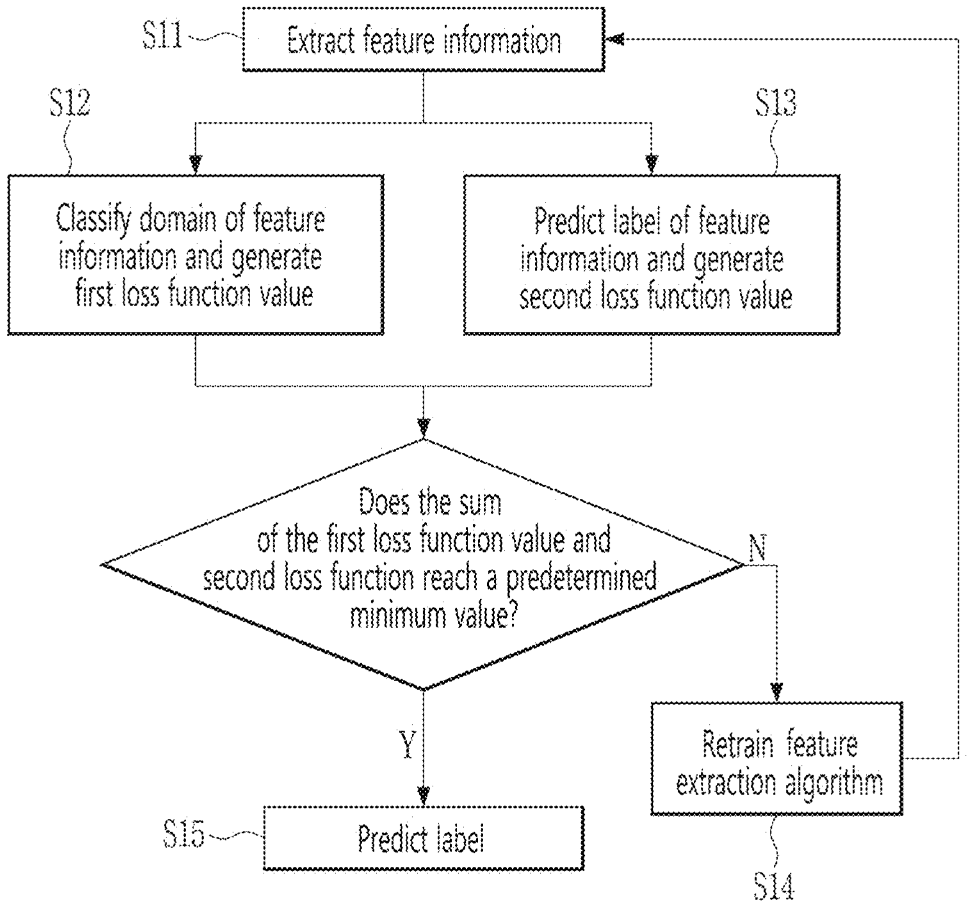
FIG. 4 shows example operations for generating a domain adaptation model and predicting P-impedance value of a target area based on an embodiment.

FIG. 4 shows example operations for generating a domain adaptation model and predicting P-impedance value of a target area based on an embodiment. Reference will be made to FIGS. 1, 2 and 3 together.

The first operation S10 may be performed by the training module 21. The first operation S10 may include: an operation S11 to extract feature information from seismic data of source data associated with the source area, and feature information from seismic data of target data associated with the target area; an operation S12 to generate a first loss function value that decreases upon a decrease in an accuracy of determination in response to determining whether the feature information is associated with the source area or the target area; an operation S13 to generate a second loss function value representing a difference between a label of the feature information extracted from the source data and a label of the source data associated with well log data by predicting the label of the feature information extracted from the source data using a label prediction algorithm; an operation S14 to retrain a feature extraction algorithm to decrease the sum of the first loss function value and the second loss function value until the sum of the first loss function value and the second loss function value reaches a predetermined minimum value; and an operation S15 to predict a label corresponding to the seismic data of the target data using a label prediction algorithm. The training module 21 may generate the domain adaptation model using the feature extraction algorithm, a domain classification algorithm and the label prediction algorithm.

The operation S11 can include the following operations to extract feature information. The training module 21 may extract the feature information from the source data and the target data through the feature extraction algorithm. By using the feature extraction algorithm, the training module 21 may extract feature information from the seismic data of the source data and extract feature information from the seismic data of the target data. Feature information obtained using the non-retrained feature extraction algorithm may reflect the characteristics of the formation of a corresponding area. For example, the feature information extracted from the source data may reflect the characteristics of the formation of a source area, and the feature information extracted from the target data may reflect the characteristics of the formation of a target area.

The training module 21 may retrain the feature extraction algorithm. The retraining of the feature extraction algorithm may be performed so that it is difficult to classify a source domain and a target domain and a label is accurately predicted. The training module 21 may perform domain adaptation while retraining the feature extraction algorithm according to a domain classification result and a label prediction result.

After the feature information is extracted, the operation S12 of generating the first loss function value and the operation S13 of generating the second loss function value may be performed. The operation S12 of generating the first loss function value and the operation S13 of generating the second loss function value may be performed independently of each other and may be performed in parallel. After the feature information is extracted, the operation S12 of generating the first loss function value and the operation S13 of generating the second loss function value may be performed each by once.

The operation S12 can include the following operations to generate the first loss function value. The training module 21 may classify, using the domain classification algorithm, feature information that is obtained into feature information associated with different domains. When receiving any feature information, the domain classification algorithm may determine as to whether the feature information is the feature information of the source domain or the feature information of the target domain, and may output a result as a source or a target. The training module 21 may compare a result of the domain classification algorithm and the domain of the feature information, and may generate the first loss function value having a lower value as accuracy is lower. When a result of the domain classification algorithm matches the actual domain of the feature information, its accuracy is high, and when they do not match, its accuracy is low. The training module 21 may retrain the feature extraction algorithm so that the first loss function value becomes lower. This means that the feature extraction algorithm changes so that it is difficult to classify feature information extracted from the source domain and feature information extracted from the target domain. As the retraining of the feature extraction algorithm is repeated, feature information may be extracted so that it is difficult to classify the seismic data of the target data and the seismic data of the source data.

The S13 can include the following operations to generate the second loss function value. The training module 21 may predict a label (P-impedance value) corresponding to feature information by using the label prediction algorithm. When receiving any feature information, the label prediction algorithm may output P-impedance value corresponding to the feature information. Here, only the feature information obtained from the seismic data of the source data may be provided to the label prediction algorithm. This is because, in the source data, the well log data matching the seismic data is present as a label. The training module 21 may calculate the second loss function value indicating the difference between P-impedance value being a result of the label prediction algorithm and the P-impedance value being the well log data of the source data. The training module 21 may retrain the feature extraction algorithm so that the second loss function value becomes lower. This means that the feature extraction algorithm changes so that the P-impedance value predicted from the seismic data and the P-impedance value of the well log data become as similar as possible. As the retraining of the feature extraction algorithm is repeated, feature information may be extracted so that the P-impedance value predicted from the seismic data of the source data becomes the same as the P-impedance value of the well log data.

It may be determined whether a value obtained by summing the first loss function value and the second loss function value is minimum. The value obtained by summing the first loss function value and the second loss function value may indicate the degree of classification of a domain from which feature information is extracted and the degree of accurate prediction of a label from the feature information. When the value obtained by summing the first loss function value and the second loss function value is minimum, it means that it is difficult to classify a domain from which feature information is extracted and the feature extraction algorithm is trained to accurately predict a label from the feature information. The training module 21 determines whether the value obtained by summing the first loss function value and the second loss function value is minimum. When the value is not the minimum value, the training module 21 may perform the operation S14 to retrain the feature extraction algorithm, and when the value is the minimum, the training module 21 may perform the operation S15 to extract feature information from the seismic data of the target data and to predict a label.

The operation S14 can include the following operations to retrain the feature extraction algorithm. The training module 21 may retrain the feature extraction algorithm so that the sum of the first loss function value and the second loss function value is low. Each time retraining is performed, the feature extraction algorithm may be modified so that it is difficult to classify the domain of feature information and a label is accurately predicted from the feature information. After retraining the feature extraction algorithm, the process may return to perform the step S11 of extracting feature information again. When feature information is extracted after retraining the feature extraction algorithm, feature information which is more difficult to classify a domain than previously extracted feature information and is capable of accurately predicting a label may be extracted.

The operation S15 of predicting a label may be performed when the sum of the first loss function value and the second loss function value reaches a predetermined minimum value. To perform the operation S15 of predicting a label, the training module 21 may stop training of the domain adaptation model. That is to say, the process of retraining the feature extraction algorithm may be stopped. By using the label prediction algorithm, the training module 21 may predict a label (P-impedance value) from the feature information corresponding to the seismic data of the target data. When the training module 21 predicts the P-impedance value, the second operation S20 may be performed next.

Figure 5:
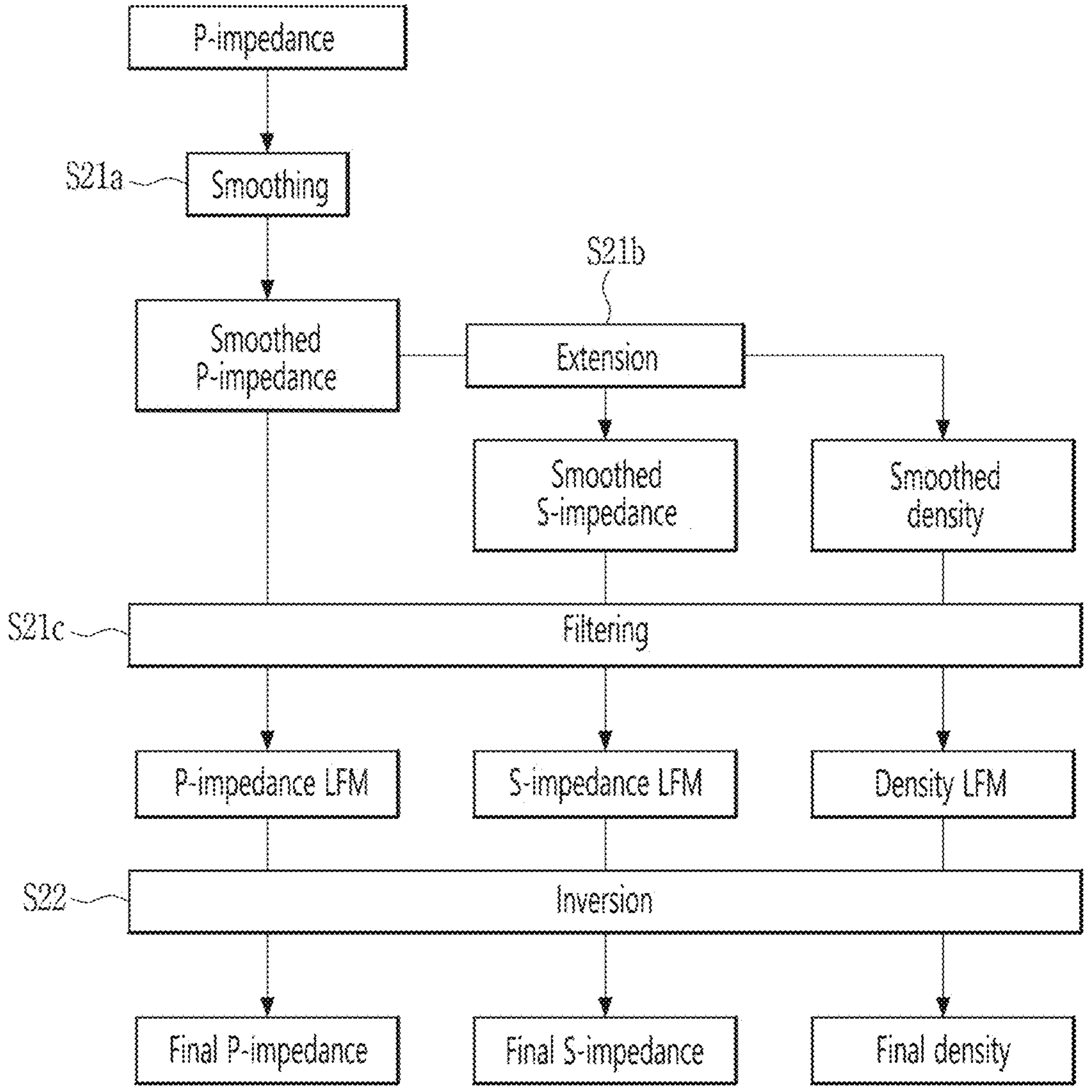
FIG. 5 shows an example of a second operation based on an embodiment.

FIG. 5 shows an example of a second operation S20 based on an embodiment.

The second operation S20 may include the preprocessing operation S21 of generating the P-impedance low frequency model using the P-impedance value, and the inversion operation S22 of predicting the final P-impedance value by performing inversion using the P-impedance low frequency model and the seismic data of the target data. The preprocessing operation S21 may include a smoothing operation S21*a* by obtaining a smoothed P-impedance value value by smoothing the P-impedance value, and a filtering operation S21*c* by obtaining the P-impedance low frequency model by applying a filter to the smoothed P-impedance value. The preprocessing operation S21 of the second operation S20 may be performed by the preprocessing module 22, and the inversion operation S22 may be performed by the inversion module 23.

The smoothing operation S21*a* may include obtaining, by the preprocessing module 22, the smoothed P-impedance value by smoothing the P-impedance value. Smoothing is a process of smoothly adjusting the boundary between an arbitrary point and an adjacent point of the P-impedance value. The smoothing may use a known algorithm. The smoothing is performed to increase the structural continuity of the P-impedance value, and a structure smoothing technique may be used for smoothing. After performing the smoothing operation S21*a*, the filtering operation S21*c* may be performed.

To perform the filtering operation S21*c*, the preprocessing module 22 may generate the P-impedance low frequency model (P-impedance LFM) by passing the smoothed P-impedance value through a filter. The filter may remove high frequency bands. The filter may be formed as a bandpass filter or a low pass filter. The P-impedance low frequency model may be formed as high frequency components are removed from the smoothed P-impedance value. When the P-impedance low frequency model is generated, the inversion operation S22 may be performed.

The inversion operation S22 may include performing, by the inversion module 23, inversion using the P-impedance low frequency model and the seismic data and output the final P-impedance value. The inversion may be performed using a known inversion method. The inversion module 23 may predict the final P-impedance value in the target area with high accuracy. Therefore, the user may more accurately analyze the state of the formation using the final P-impedance value.

The impedance inversion method based on the disclosed technology may also predict final S-impedance value and final density value of the target area. The preprocessing operation S21 of the impedance inversion method may further include an extension operation S21*b*. The extension operation S21*b* is to obtain smoothed S-impedance value or smoothed density value using the smoothed P-impedance value.

The preprocessing operation S21 may further include the extension operation S21*b* of obtaining a smoothed S-impedance value using the smoothed P-impedance value. The extension operation S21*b* may further obtain a smoothed density value using the smoothed P-impedance value.

The extension operation S21*b* may convert the smoothed P-impedance value into the smoothed S-impedance value using a relational expression derived on the basis of the relationship between a P-impedance value and an S-impedance value included in the well log data of the source data. Similarly, the extension operation S21*b* may convert the smoothed P-impedance value into the smoothed density value using a relational expression derived on the basis of the relationship between a P-impedance value and density value included in the well log data of the source data.

In the extension operation S21*b*, both smoothed S-impedance value and smoothed density value may be obtained. The extension operation S21*b* may be performed in the preprocessing module 22. The preprocessing module 22 may obtain information necessary for extension from the well log data of the source data. The well log data may include P-impedance value, S-impedance value, density value and various other parameters actually measured in the formation. The preprocessing module 22 may grasp the relationship between the P-impedance value and the S-impedance value of the well log data as a function. Similarly, the preprocessing module 22 may grasp the relationship between the P-impedance value and the density value of the well log data as a function. By using the function between the P-impedance value and the S-impedance value of the source area, the preprocessing module 22 may obtain the smoothed S-impedance value from the smoothed P-impedance value of the target area. Similarly, by using the function between the P-impedance value and the density value of the source area, the preprocessing module 22 may obtain the smoothed density value from the smoothed P-impedance value of the target area. By performing the extension operation S21*b*, the smoothed S-impedance value and the smoothed density value of the target area may be obtained from the smoothed P-impedance value of the target area. After performing the extension operation S21*b*, the filtering operation S21*c* and the inversion operation S22 may be performed even on the smoothed S-impedance value and the smoothed density value.

The filtering operation S21*c* may include further obtaining, by applying a filter to the smoothed S-impedance value, an S-impedance low frequency model (S-impedance LFM). The filtering operation S21*c* may include further obtaining, by applying a filter to the smoothed density value, a density low frequency model (density LFM). Similarly to filtering the smoothed P-impedance value, the S-impedance low frequency model may be obtained by filtering the smoothed S-impedance value, and the density low frequency model may be obtained by filtering the smoothed density value. The S-impedance low frequency model and the density low frequency model may be removed with high frequency components.

The inversion operation S22 may be performed to predict the final P-impedance value and the final S-impedance value by performing simultaneous inversion on the P-impedance value and the S-impedance value using the P-impedance low frequency model, the S-impedance low frequency model and the seismic data of the target data.

The inversion operation S22 may predict the final P-impedance value, the final S-impedance value and the final density value by performing a simultaneous inversion on the P-impedance value, the S-impedance value and the density value using the P-impedance low frequency model, the S-impedance low frequency model, the density low frequency model and the seismic data of the target data.

The inversion operation S22 may perform inversion on only the P-impedance value, may perform simultaneous inversion on the P-impedance value and the S-impedance value or may perform simultaneous inversion on the P-impedance value, the S-impedance value and the density value.

Some embodiments of the disclosed technology will be described below with reference to FIGS. 6 to 11.

Figure 6:
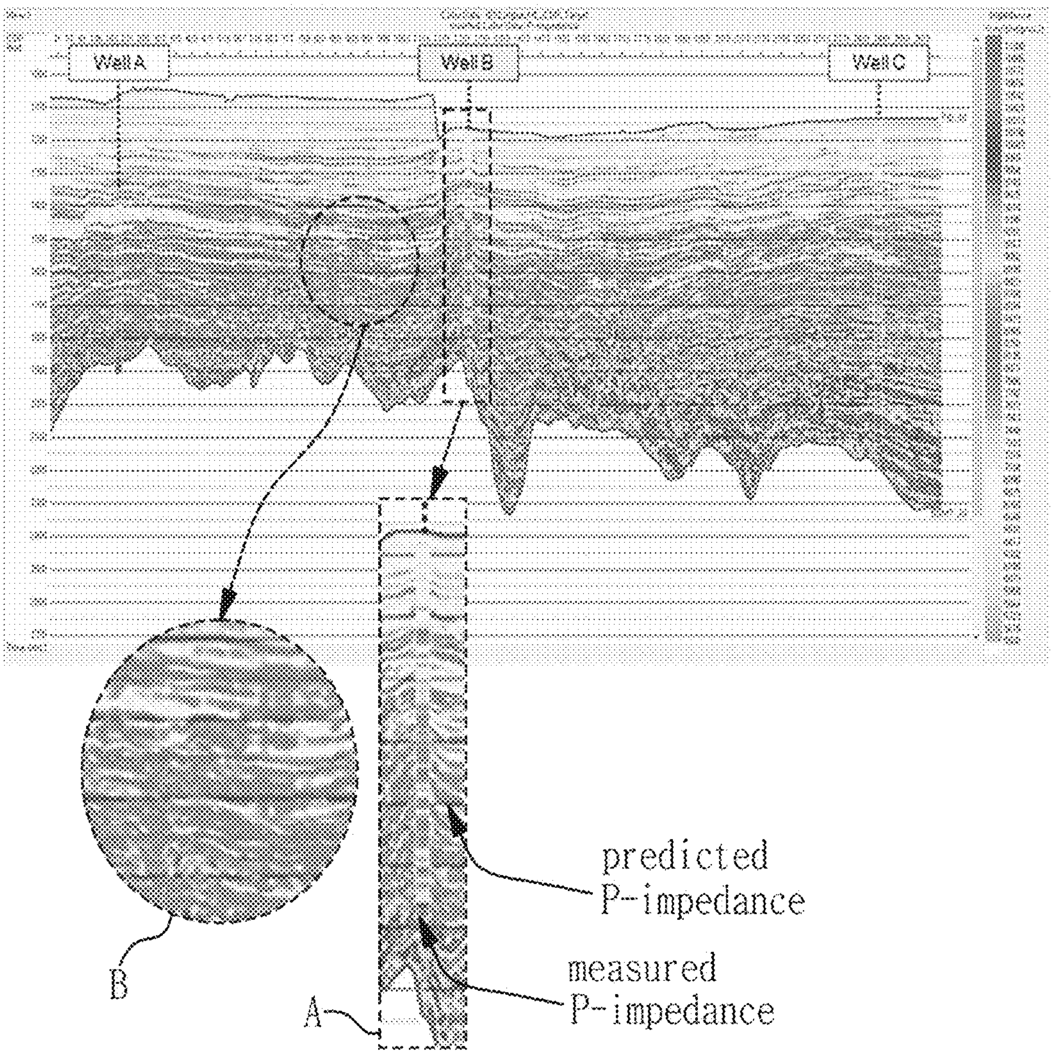
FIG. 6 shows an example of P-impedance value predicted by a training module based on the embodiment.

FIG. 6 shows an example of P-impedance value predicted by the training module 21 based on an embodiment. In FIG. 6, on a view showing predicted P-impedance, measured P-impedance log obtained from well log data of a well A, a well B and a well C is shown in an overlapping manner.

In an embodiment, the well B is assumed as a target area and used as blind well, and well log data obtained from the well B is not used in training. The well A and the well Care source areas, and well log data obtained from the well A and the well C are used in training.

The first operation S10 may include predicting, by the training module 21, P-impedance value of the well B area being the target area, by training source data of the well A and well C areas and target data of the well B area. The source data may include seismic data and well log data of the well A and well C, and the target data may include seismic data of the well B. Referring to the enlarged view A of a portion corresponding to the well B in FIG. 6, it may be seen that there is a discrepancy between measured P-impedance log actually included in the well log data of the well B and P-impedance predicted based on an embodiment. Therefore, in order to obtain more accurate P-impedance value, the second operation S20 based on an embodiment may be further performed.

Figure 7:
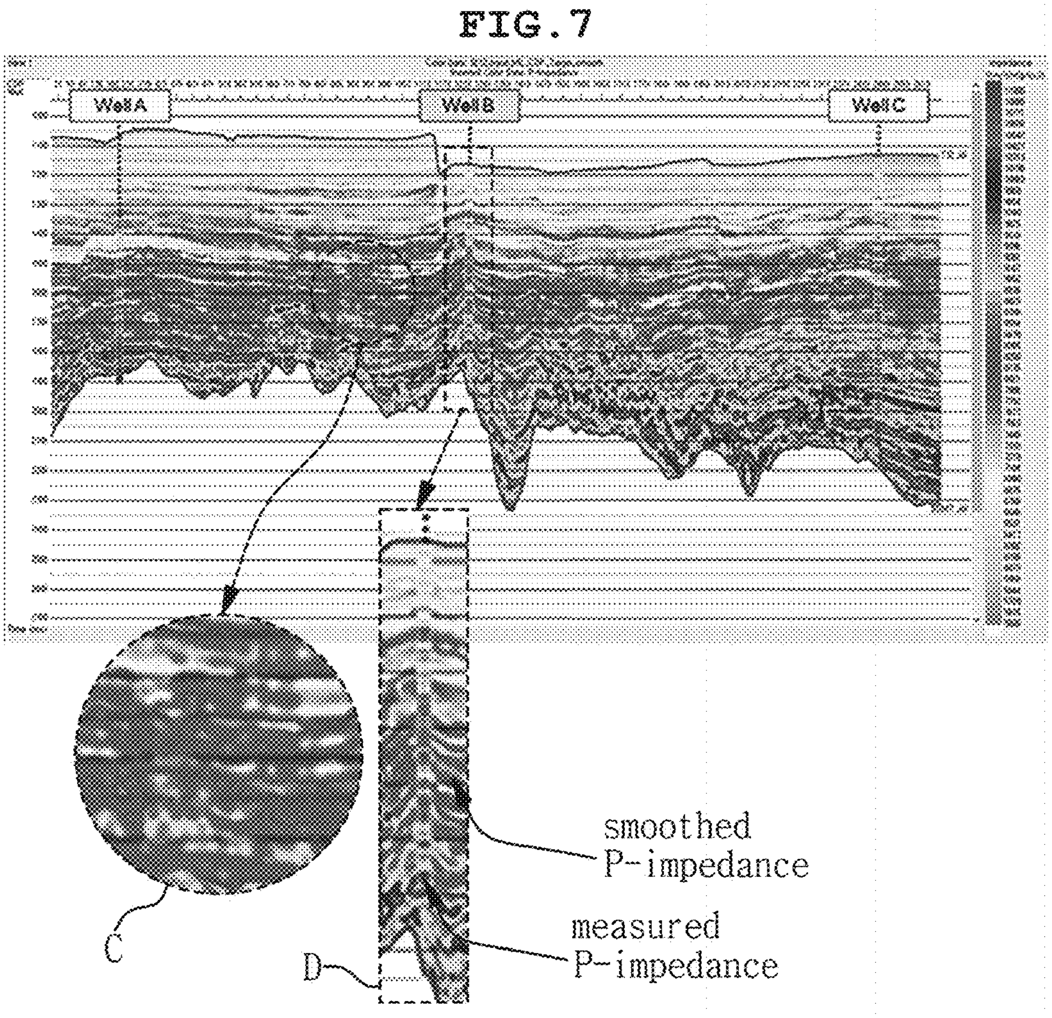
FIG. 7 shows an example of smoothed P-impedance value based on an embodiment.

FIG. 7 shows an example of smoothed P-impedance based on an embodiment.

The second operation S20 may include obtaining, by the preprocessing module 22, smoothed P-impedance as shown in FIG. 7 by performing the smoothing step S21*a*. Referring to the enlarged view B of FIG. 6, it may be seen that the P-impedance predicted based on an embodiment lacks structural continuity, so that the boundary between an arbitrary point and an adjacent point is relatively clear and the magnitude of the P-impedance is variously distributed. Referring to the enlarged view C of FIG. 7, it may be seen that the P-impedance smoothed based on an embodiment is improved in structural continuity by smoothing, so that the boundary between an arbitrary point and an adjacent point is smoothly connected and the magnitude of the P-impedance appears continuously. Referring to the enlarged view D of FIG. 7, compared to the enlarged view A of FIG. 6, it may be seen that structural continuity is improved by smoothing.

Figure 8:
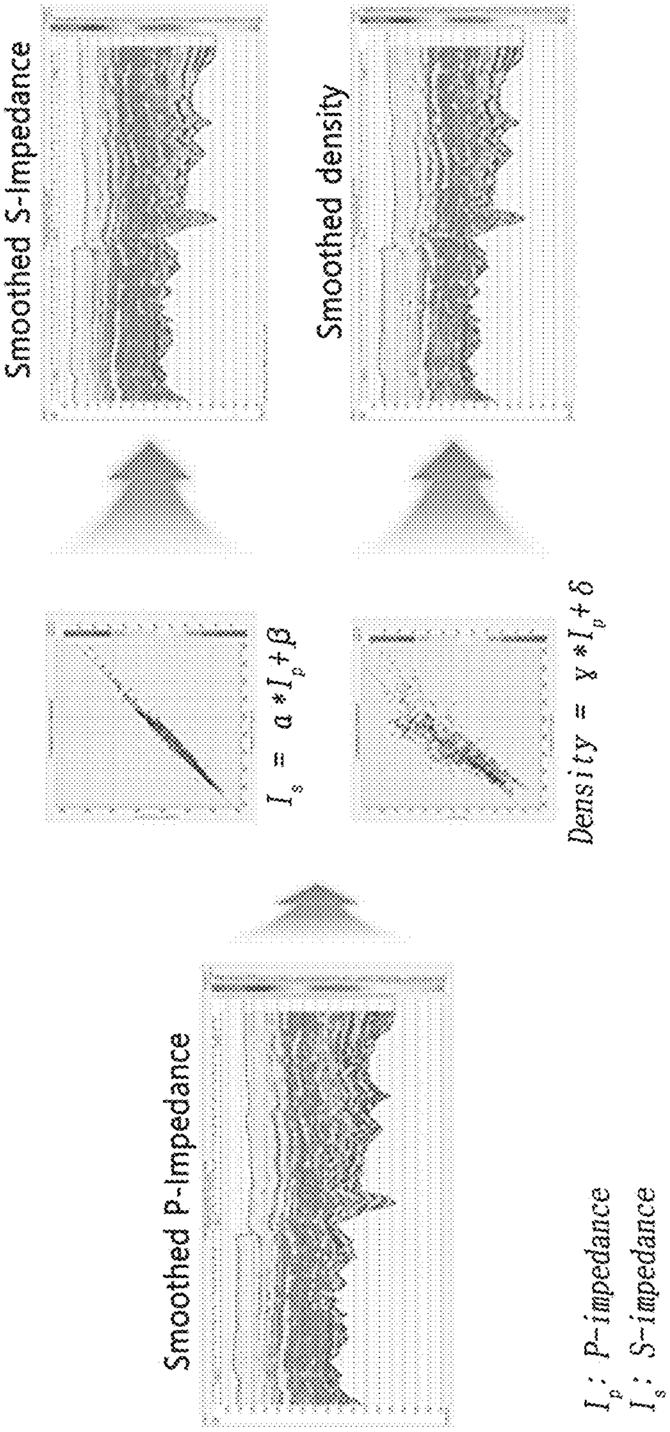
FIG. 8 shows an example process of obtaining smoothed S-impedance value and smoothed density value based on an embodiment.

FIG. 8 shows an example process of obtaining smoothed S-impedance and smoothed density based on an embodiment.

The extension operation S21*b* may include obtaining, on the basis of the smoothed P-impedance value, smoothed S-impedance value through a relational expression $I_z=\alpha*I_p+\beta$ between P-impedance value and S-impedance value logs. In the relational expression, Is is S-impedance value, Ip is P-impedance value, and $\alpha$ and $\beta$ are values obtained by the correlation of the P-impedance value and the S-impedance value logs.

On the basis of the smoothed P-impedance value, smoothed density value may be obtained through a relational expression Density=$\gamma*I_p+\delta$ between P-impedance value and density value logs. In the relational expression, Ip is P-impedance value, and $\gamma$ and $\delta$ are values obtained by the correlation of the P-impedance value and the density value logs.

The smoothed S-impedance value and the smoothed density value may also be formed with improved structural continuity.

Figure 9:
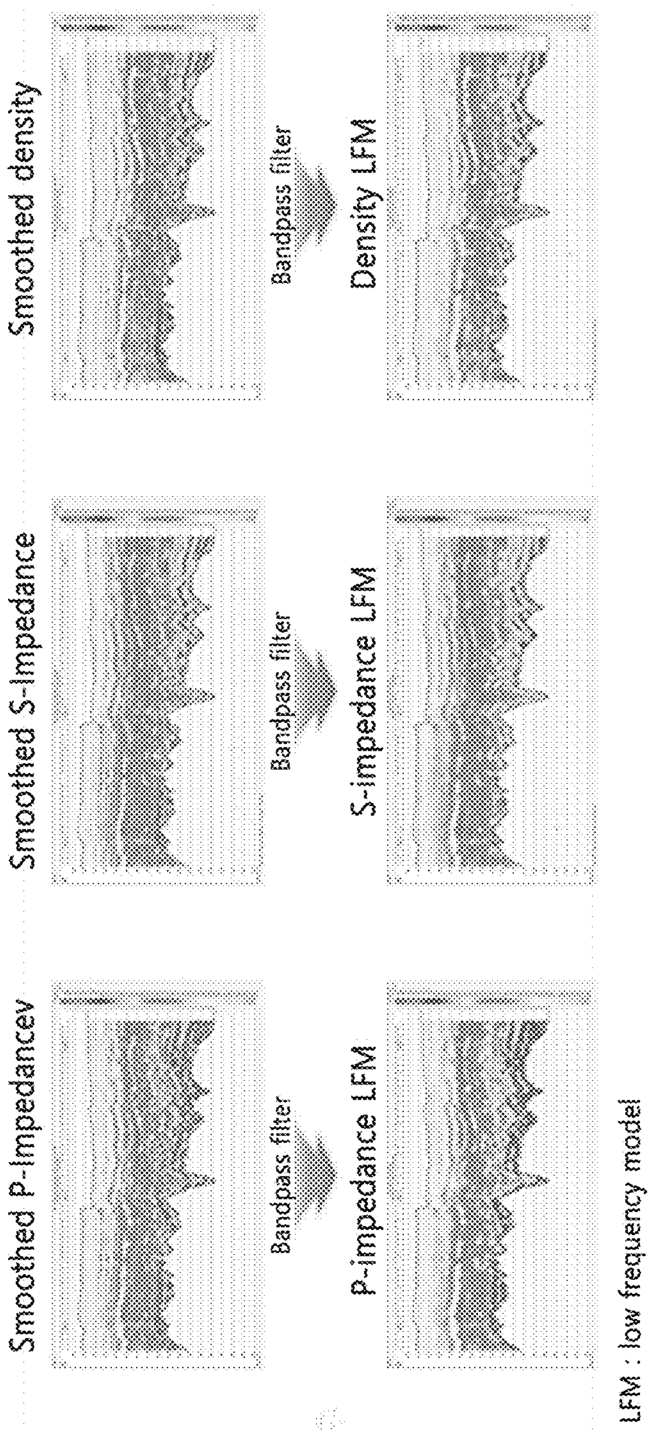
FIG. 9 shows an example process of obtaining a low frequency impedance model based on an embodiment.

FIG. 9 is a view explaining a process of obtaining a low frequency impedance model based on an embodiment.

The preprocessing operation S21 may include obtaining, by the preprocessing module 22, a P-impedance low frequency model (P-impedance LFM), an S-impedance low frequency model (S-impedance LFM) and a density low frequency model (density LFM) by filtering the smoothed P-impedance value, the smoothed S-impedance value and the smoothed density value with bandpass filters. A low frequency model may be created as high frequency components are removed by the filtering.

Figure 10:
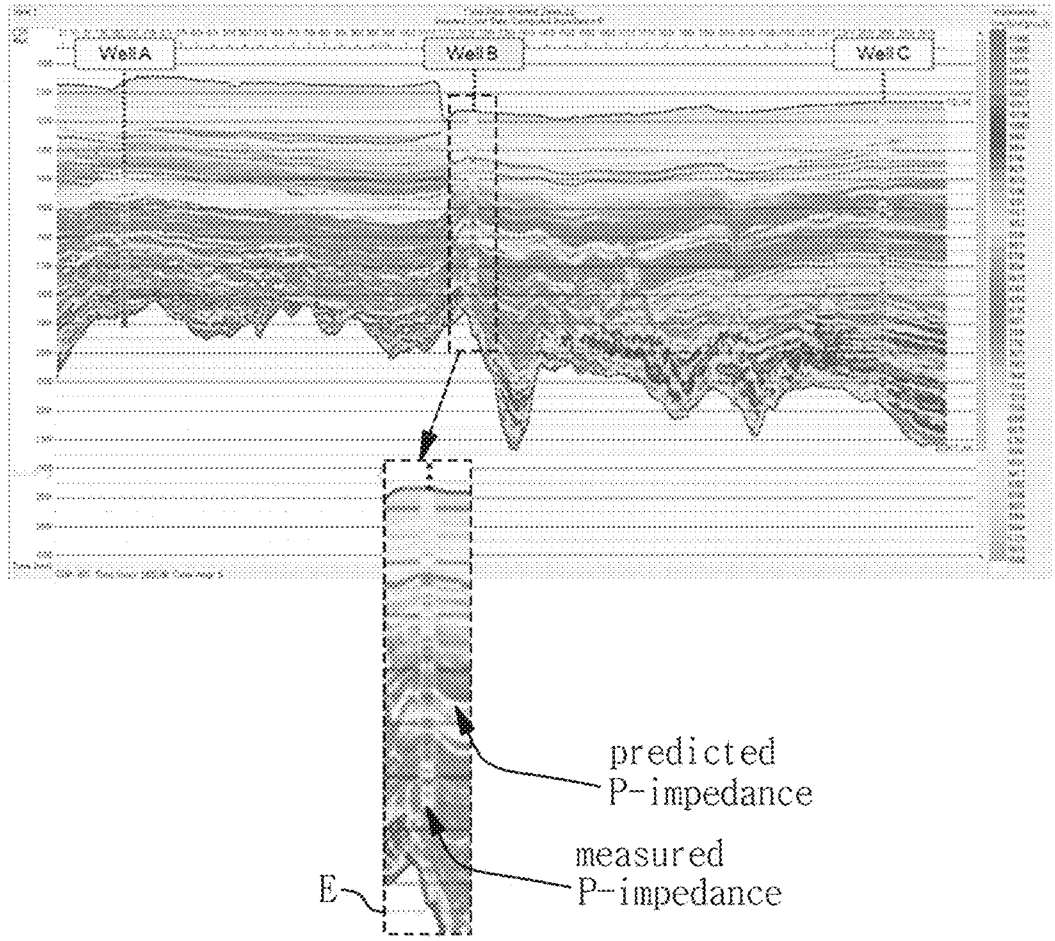
FIG. 10 shows an example of P-impedance value obtained by an inversion method of a comparative example.
Figure 11:
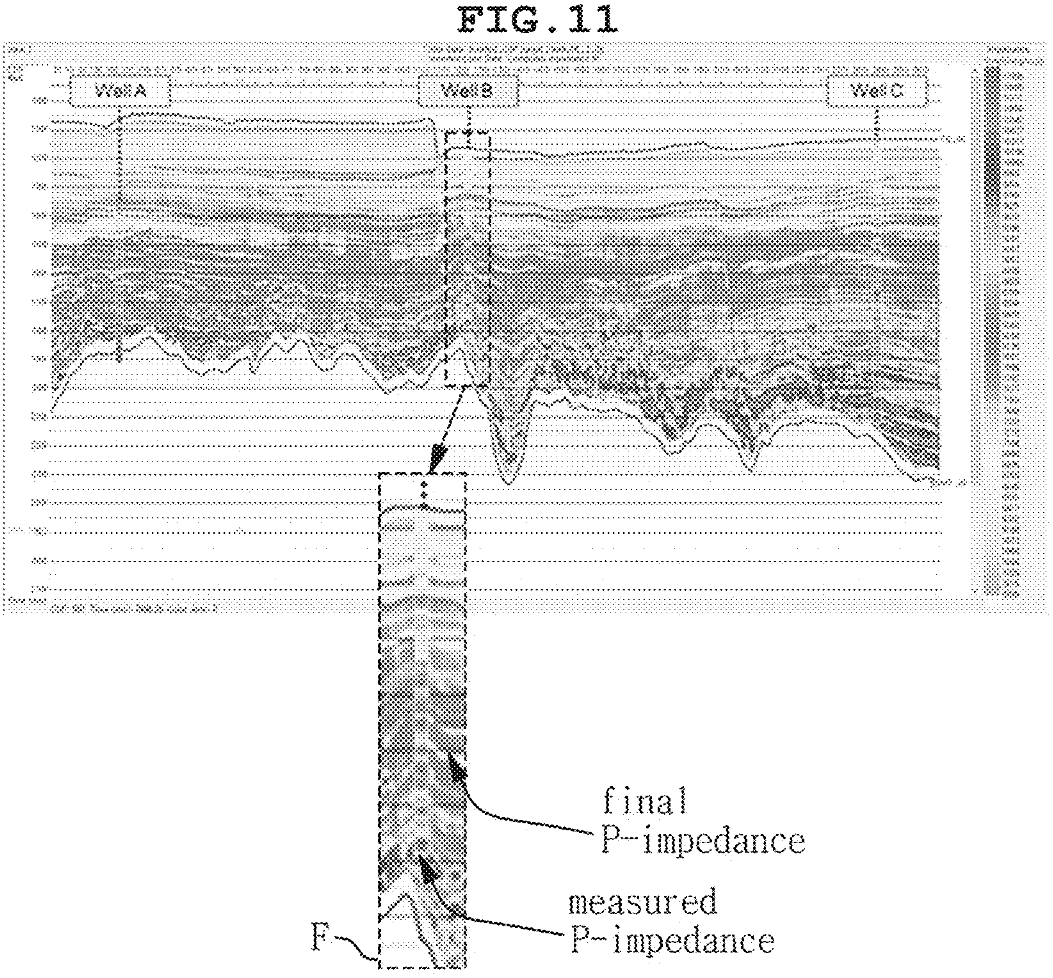
FIG. 11 shows an example of the final P-impedance value obtained based on an embodiment.

FIG. 10 shows an example of P-impedance obtained by an inversion method of a comparative example. FIG. 11 shows an example of the final P-impedance obtained based on an embodiment. The improved accuracy of the impedance prediction method based on some embodiments of the disclosed technology will be described below by comparing FIGS. 10 and 11.

FIG. 10 shows, on the assumption that well B is blind well, P-impedance predicted according to a general inversion method using seismic data and well log data obtained in well A and well C areas, and shows, in an overlapping manner, measured P-impedance log obtained in the well B area. Referring to the enlarged view E of a portion of the well B, a number of points where the measured P-impedance log and the predicted P-impedance do not match are identified.

FIG. 11 shows an example of the final P-impedance obtained by performing inversion using the P-impedance low frequency model shown in FIG. 9 and the seismic data of the well B based on an embodiment, and shows, in an overlapping manner, measured P-impedance log obtained in the well B. Referring to the enlarged view F of a portion of the well B, it may be seen that the number of points where the measured P-impedance log and the final P-impedance predicted based on an embodiment do not match is significantly small and the P-impedance appears in similar sizes in a horizontal direction in which a formation is formed.

Only a few implementations and examples are described and other implementations, enhancements and variations can be made based on what is described and illustrated in this patent document.

What is claimed is:

1. A machine learning-based two-step impedance inversion method for identifying a presence of subsurface gas or oil reservoirs in a target area that does not include a well using seismic data, comprising:

directing seismic energy into the target area and detecting reflected seismic waves;

generating a domain adaptation model based on a source data associated with a source area that includes a well and the detected reflected seismic waves from the target area, and predicting a P-impedance value of the target area;

generating, using the P-impedance value generated by the domain adaptation model, a P-impedance low frequency model configured to predict a final P-impedance value of the target area by performing an inversion, the generating the P-impedance low frequency model comprising performing a preprocessing operation by generating the P-impedance low frequency model using the P-impedance value, the preprocessing operation comprising:

performing a smoothing operation by obtaining a smoothed P-impedance value by smoothing the P-impedance value; and performing a filtering operation by obtaining the P-impedance low frequency model by applying a filter to the smoothed P-impedance value; and displaying a prediction result for the presence of the subsurface gas or oil to a user.

2. The impedance inversion method of claim 1, wherein generating the domain adaptation model comprises:

extracting: feature information from seismic data of the source data associated with the source area; and feature information from seismic data of target data associated with the target area;

generating a first loss function value that decreases upon a decrease in an accuracy of determination in response to determining whether the feature information is associated with the source area or the target area;

generating a second loss function value representing a difference between a label of the feature information extracted from the source data and a label of the source data associated with well log data by predicting the label of the feature information extracted from the source data using a label prediction algorithm;

retraining a feature extraction algorithm to decrease a sum of the first loss function value and the second loss function value until the sum of the first loss function value and the second loss function value reaches a predetermined minimum value; and predicting a label corresponding to the seismic data of the target data using the label prediction algorithm.

3. The impedance inversion method of claim 1, wherein generating the P-impedance low frequency model further comprises:

performing an inversion operation by predicting the final P-impedance value using the P-impedance low frequency model and the seismic data of the target data.

4. The impedance inversion method of claim 3, wherein the preprocessing operation further comprises:

performing an extension operation by obtaining a smoothed S-impedance value using the smoothed P-impedance value, wherein the filtering operation further includes obtaining an S-impedance low frequency model by applying a filter to the smoothed S-impedance value, and wherein the inversion operation includes predicting the final P-impedance value of the target area and a final S-impedance value of the target area by performing a simultaneous inversion on the P-impedance value and an S-impedance value using the P-impedance low frequency model, the S-impedance low frequency model and the seismic data of the target data.

5. The impedance inversion method of claim 4, wherein the extension operation further includes obtaining a smoothed density value using the smoothed P-impedance value, wherein the filtering operation further includes obtaining a density low frequency model by applying a filter to the smoothed density value, and wherein the inversion operation includes predicting the final P-impedance value of the target area, the final S-impedance value of the target area, and a final density value of the target area by performing a simultaneous inversion on the P-impedance value, the S-impedance value, and density value using the P-impedance low frequency model, the S-impedance low frequency model, the density low frequency model and the seismic data of the target data.

6. The impedance inversion method of claim 4, wherein the extension operation includes converting the smoothed P-impedance value into the smoothed S-impedance value using a relational expression derived from a relationship between a P-impedance value and an S-impedance value included in well log data of the source data.

7. The impedance inversion method of claim 5, wherein the extension operation includes converting the smoothed P-impedance value into the smoothed density value using a relational expression derived from a relationship between a P-impedance value and a density value included in well log data of the source data.

8. A machine learning-based two-step impedance inversion apparatus configured to identify a presence of subsurface gas or oil reservoirs in a target area that does not include a well using seismic data, comprising:

a processor;

a storage unit communicatively connected to the processor, the storage unit being configured to store:

program codes operating in the processor, data defining reflected seismic waves resulting from directing seismic energy in the target area, and source data associated with a source area that includes a well the program codes comprising:

a training module configured to generate a domain adaptation model for predicting a P-impedance value of a target area that does not include a well by using source data obtained from a source area that includes a well and target data obtained from the target area;

a preprocessing module configured to generate a P-impedance low frequency model by using the P-impedance value generated by the domain adaptation model, the preprocessing module being further configured to:

obtain a smoothed P-impedance value by smoothing the P-impedance value; and obtain a P-impedance low frequency model by applying a filter to the smoothed P-impedance value; and an inversion module configured to generate a final P-impedance value by performing an inversion using the P-impedance low frequency model and the target data; and an input/output interface configured to display a prediction result for the presence of the subsurface gas or oil to a user.

9. The impedance inversion apparatus of claim 8, wherein the training module is configured to:

extract feature information from seismic data of the source data and feature information from seismic data of the target data, using a feature extraction algorithm;

determine, using a domain classification algorithm, whether the feature information is associated with the source area or the target area;

generate a first loss function value that decreases upon a decrease in an accuracy of determination using the domain classification algorithm;

predict, using a label prediction algorithm, a label of the feature information extracted from the seismic data of the source data;

generate a second loss function value that decreases upon an increase in the accuracy of prediction;

retrain the feature extraction algorithm to decrease a sum of the first loss function value and the second loss function value;

stop training the domain adaptation model upon a determination that the sum of the first loss function value and the second loss function value reaches a predetermined minimum value; and predict a label corresponding to the seismic data of the target data using the label prediction algorithm.

10. The impedance inversion apparatus of claim 8, wherein:

the preprocessing module is further configured to: obtain a smoothed S-impedance value using the smoothed P-impedance value; and obtain an S-impedance low frequency model by applying a filter to the smoothed S-impedance value; and the inversion module is configured to predict the final P-impedance value and a final S-impedance value by performing a simultaneous inversion on the P-impedance value and an S-impedance value using the P-impedance low frequency model, the S-impedance low frequency model and the seismic data of the target data.

11. The impedance inversion apparatus of claim 10, wherein:

the preprocessing module is further configured to: obtain a smoothed density value using the smoothed P-impedance value; and obtain a density low frequency model by applying a filter to the smoothed density value; and the inversion module is configured to predict the final P-impedance value, the final S-impedance value and a final density value by performing a simultaneous inversion on the P-impedance value, the S-impedance value and a density value using the P-impedance low frequency model, the S-impedance low frequency model, the density low frequency model and the seismic data of the target data.

12. The impedance inversion apparatus of claim 10, wherein the preprocessing module is configured to convert the smoothed P-impedance value into the smoothed S-impedance value using a relational expression derived from a relationship between a P-impedance value and an S-impedance value included in well log data of the source data.

13. The impedance inversion apparatus of claim 11, wherein the preprocessing module is configured to convert the smoothed P-impedance value into the smoothed density value using a relational expression derived from a relationship between a P-impedance value and a density value included in well log data of the source data.

* * * * *